M. B. RYAN.
ELECTRIC WELDING MACHINE.
APPLICATION FILED JULY 10, 1908. RENEWED SEPT. 8, 1911.

1,023,130.

Patented Apr. 16, 1912.

7 SHEETS—SHEET 1.

Witnesses:
Inventor
Michael B. Ryan
by his Attorney

M. B. RYAN.
ELECTRIC WELDING MACHINE.
APPLICATION FILED JULY 10, 1908. RENEWED SEPT. 8, 1911.

1,023,130.

Patented Apr. 16, 1912.
7 SHEETS—SHEET 4.

Witnesses:
Everett R. Curtis
A. G. Sullivan

Inventor
Michael B. Ryan.
by his Attorney
Chas. F. Perkins

M. B. RYAN.
ELECTRIC WELDING MACHINE.
APPLICATION FILED JULY 10, 1908. RENEWED SEPT. 8, 1911.

1,023,130.

Patented Apr. 16, 1912.
7 SHEETS—SHEET 5.

Witnesses:

Inventor
Michael B. Ryan.
by his Attorney

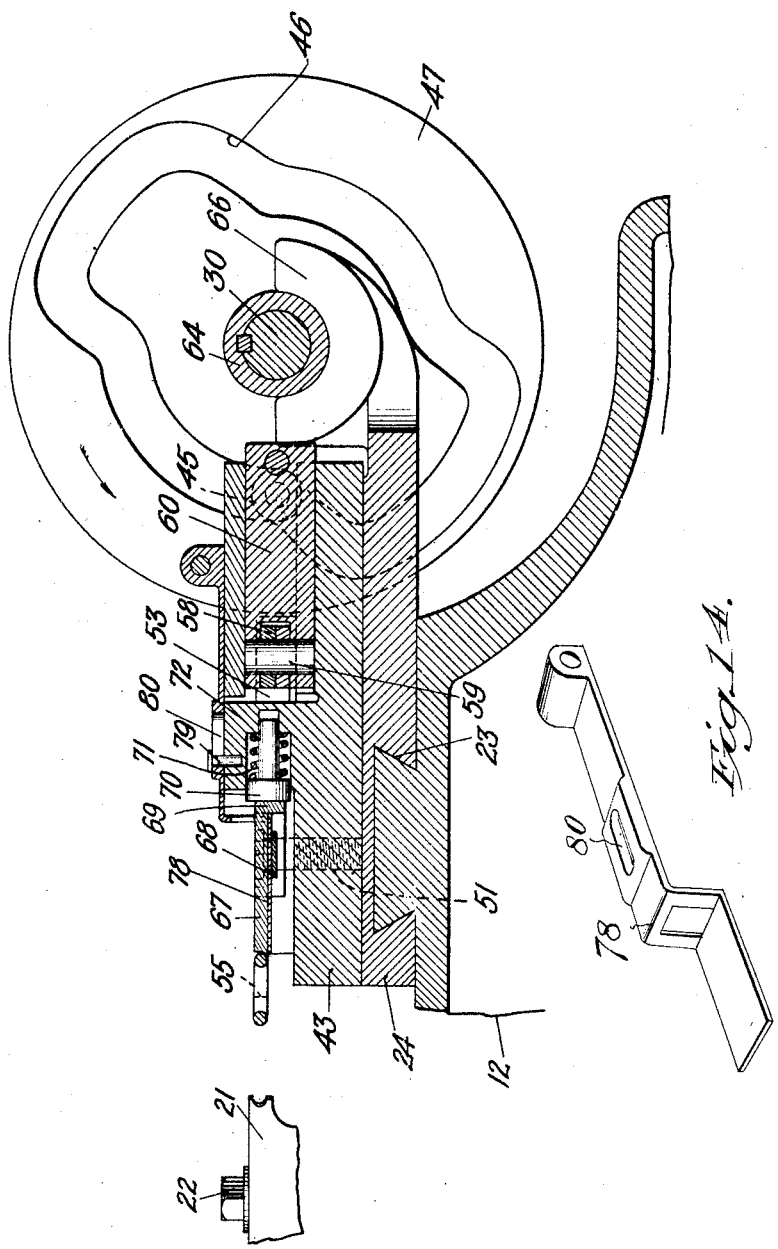

M. B. RYAN.
ELECTRIC WELDING MACHINE.
APPLICATION FILED JULY 10, 1908. RENEWED SEPT. 8, 1911.
1,023,130.
Patented Apr. 16, 1912.
7 SHEETS—SHEET 7.
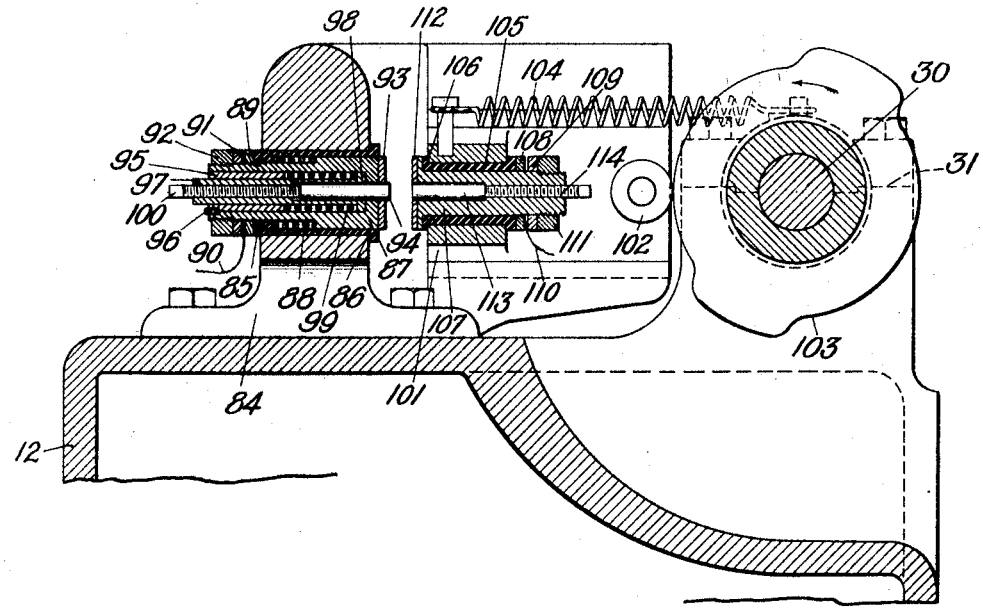
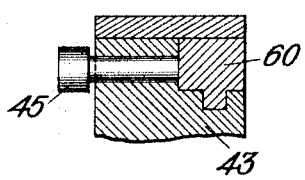
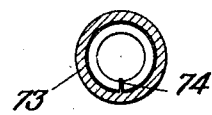
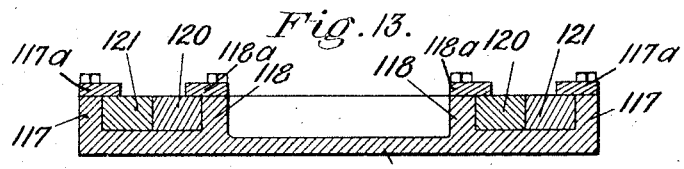
Witnesses:
Inventor
Michael B. Ryan.
by his Attorney

UNITED STATES PATENT OFFICE.

MICHAEL B. RYAN, OF BOSTON, MASSACHUSETTS, ASSIGNOR TO McKINNON CHAIN COMPANY, A CORPORATION OF NEW YORK.

ELECTRIC WELDING-MACHINE.

1,023,130.  Specification of Letters Patent.  Patented Apr. 16, 1912.

Application filed July 10, 1908, Serial No. 442,822. Renewed September 8, 1911. Serial No. 648,398.

*To all whom it may concern:*

Be it known that I, MICHAEL B. RYAN, a citizen of the United States, residing at Boston, in the county of Suffolk and State of Massachusetts, have invented new and useful Improvements in Electric Welding-Machines, of which the following is a specification.

My invention relates to electric welding machines, and its objects are to effect a compact arrangement of the mechanism, to economize the time required for welding and removing a bur, and to cheapen the cost of production.

It consists in placing a pair of electrodes between two presses for removing the bur, and in providing mechanism for moving each of two pairs of work carrying tongs alternately to the electrodes and to one of the presses, whereby the work held by one pair of tongs is being welded, while the bur of the work held by the other pair of tongs is being removed.

It further consists in constructing an automatic feeding hopper for the articles to be welded, and in locating under the same a slide carrying the tongs in a depression thereof, the upper surface of which slide and tongs is substantially smooth and offers no egress for the rings to be welded, except between the jaws of said tongs when open.

It further consists in the various improvements hereinafter more specifically described and claimed.

Figure 1:
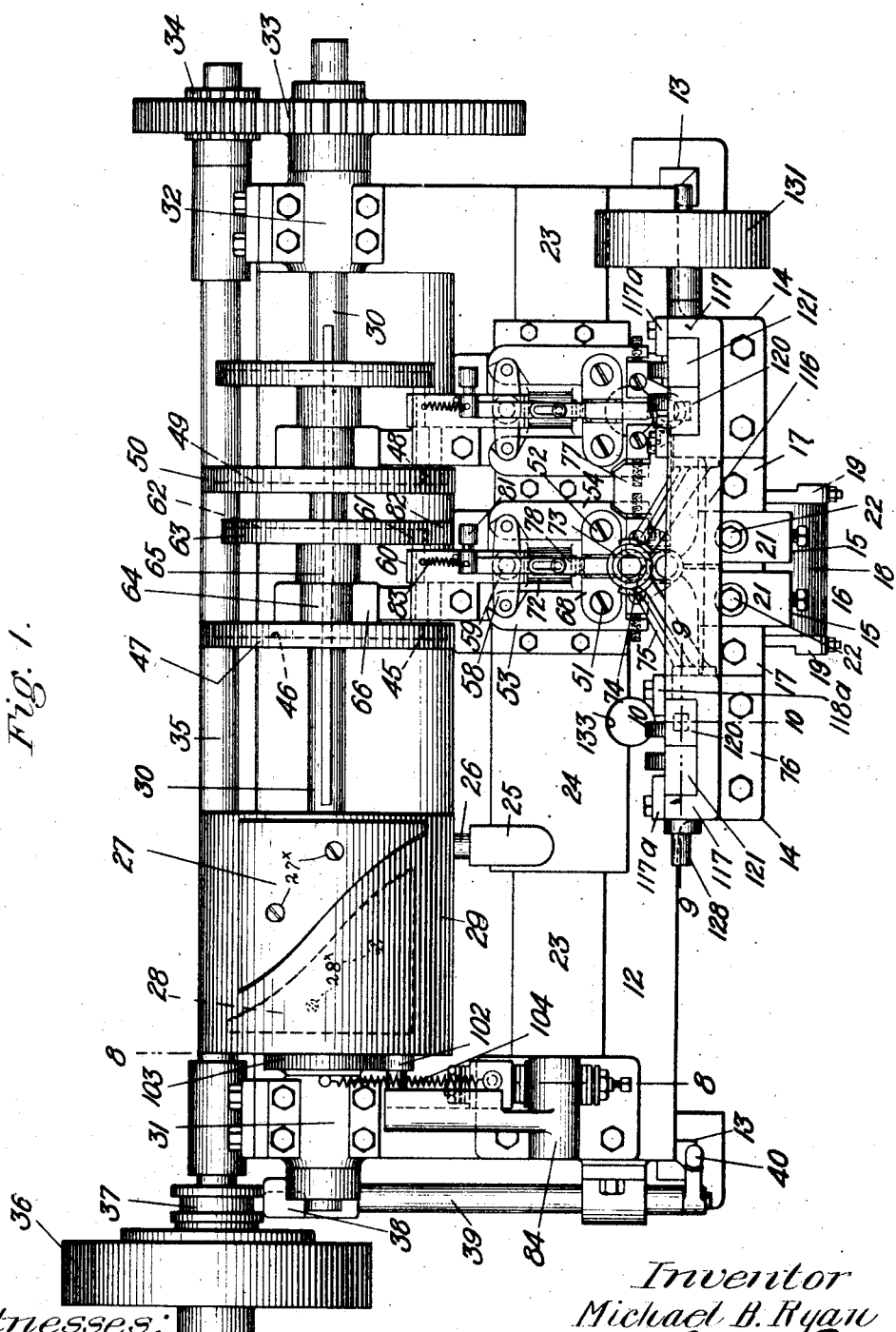
Figure 2:
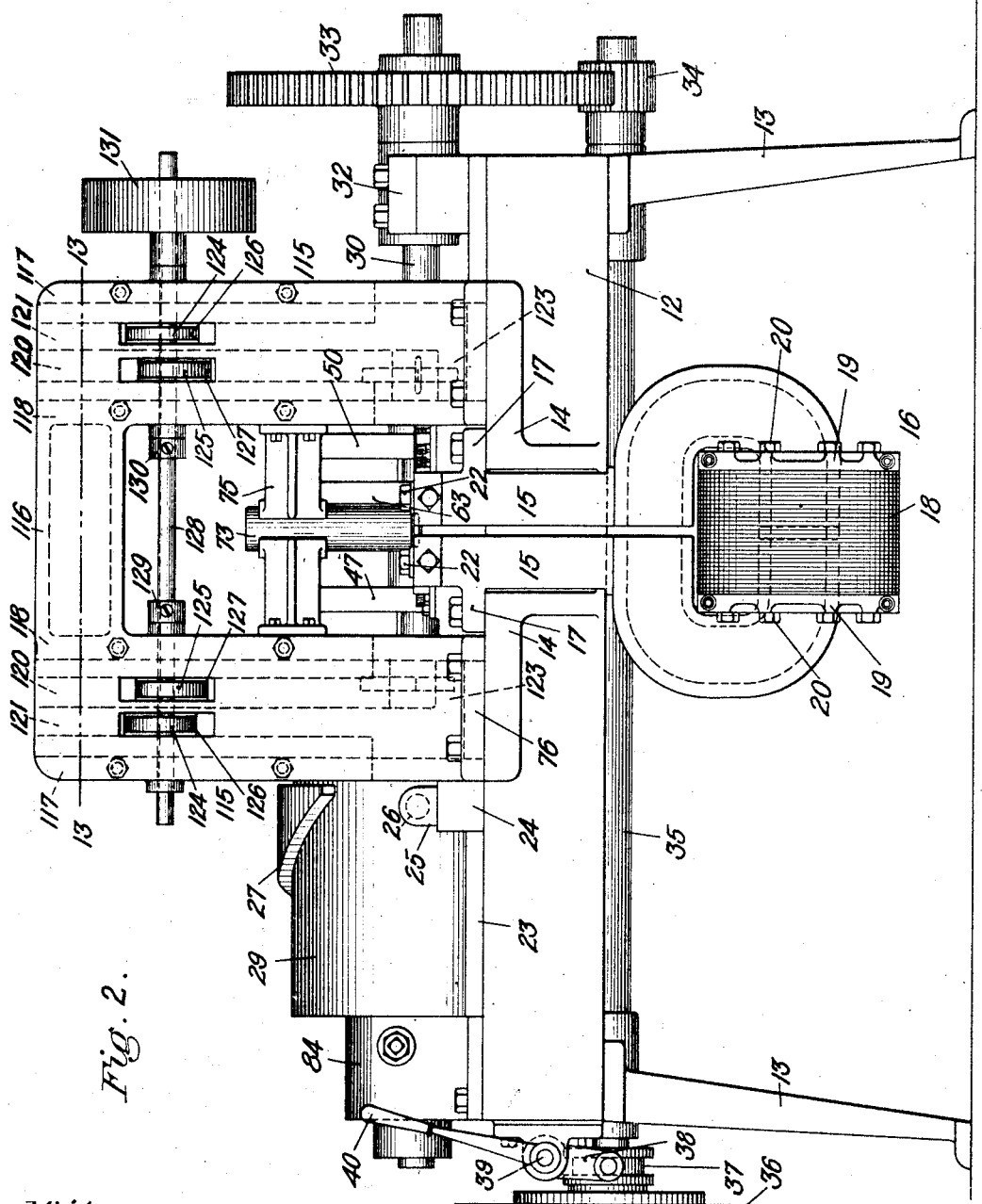
Figure 3:
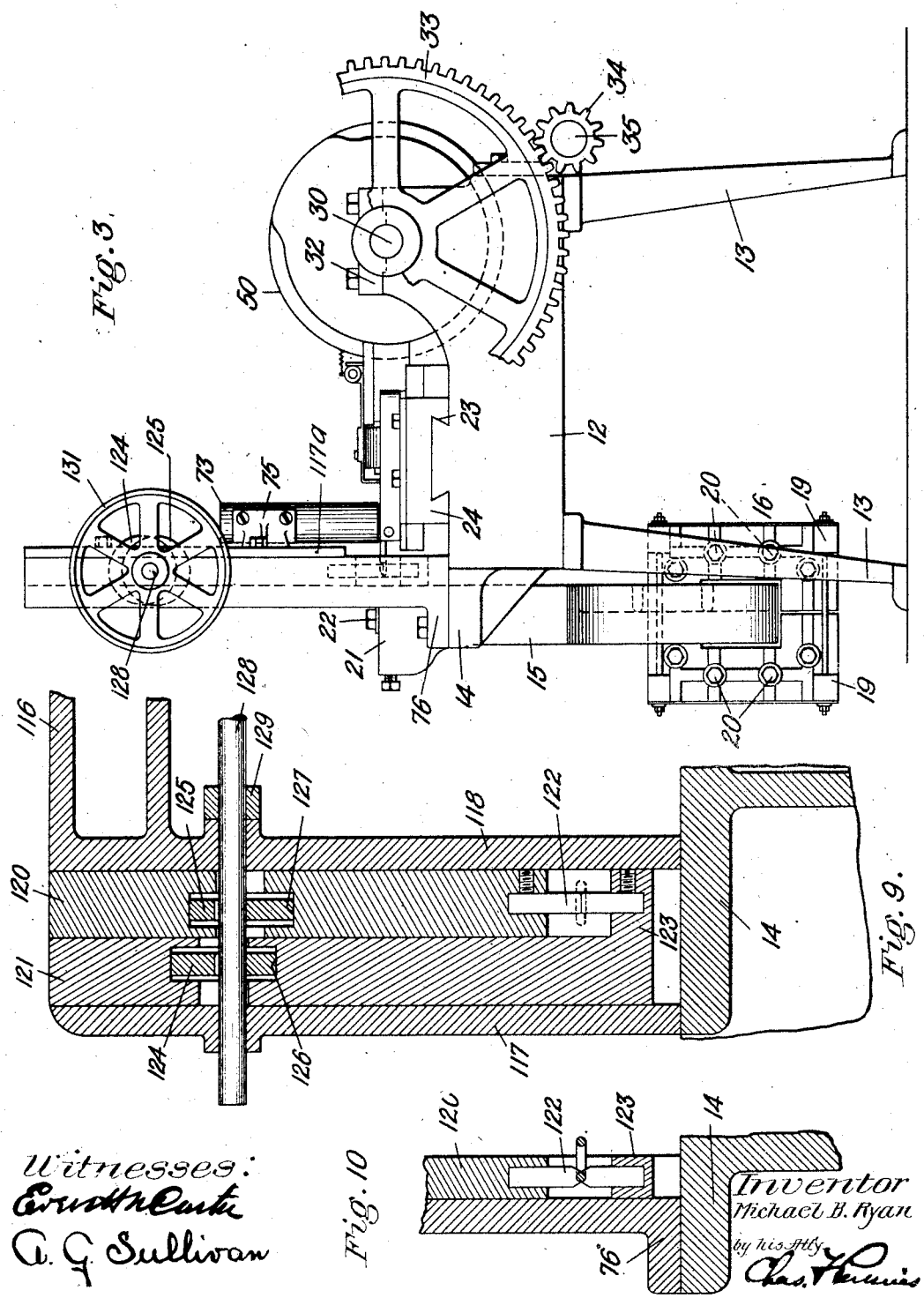
Figure 4:
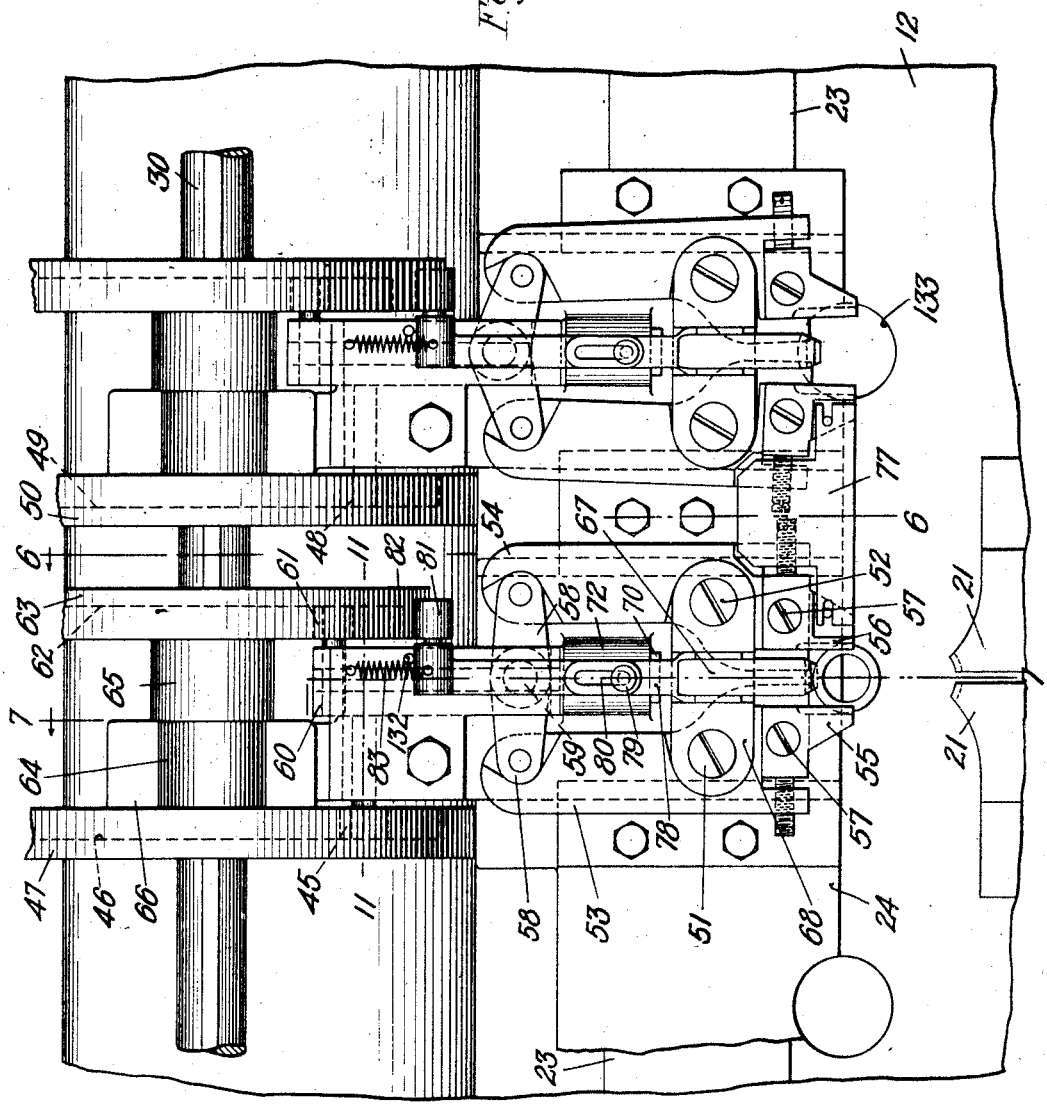
Figure 5:
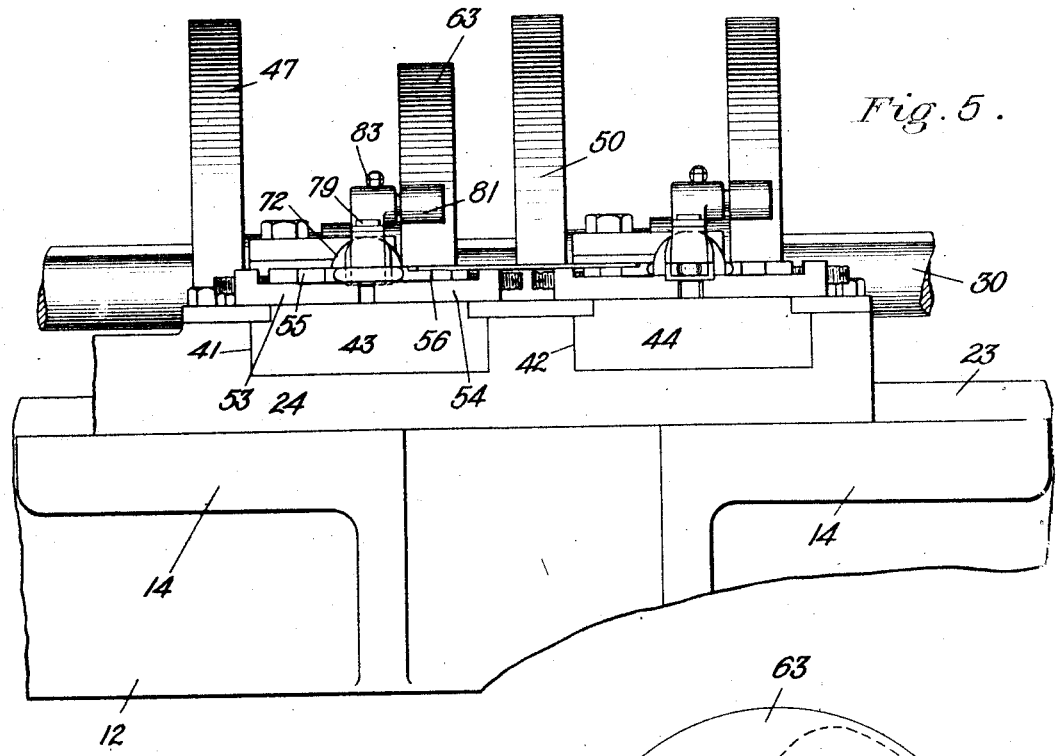
Figure 6:
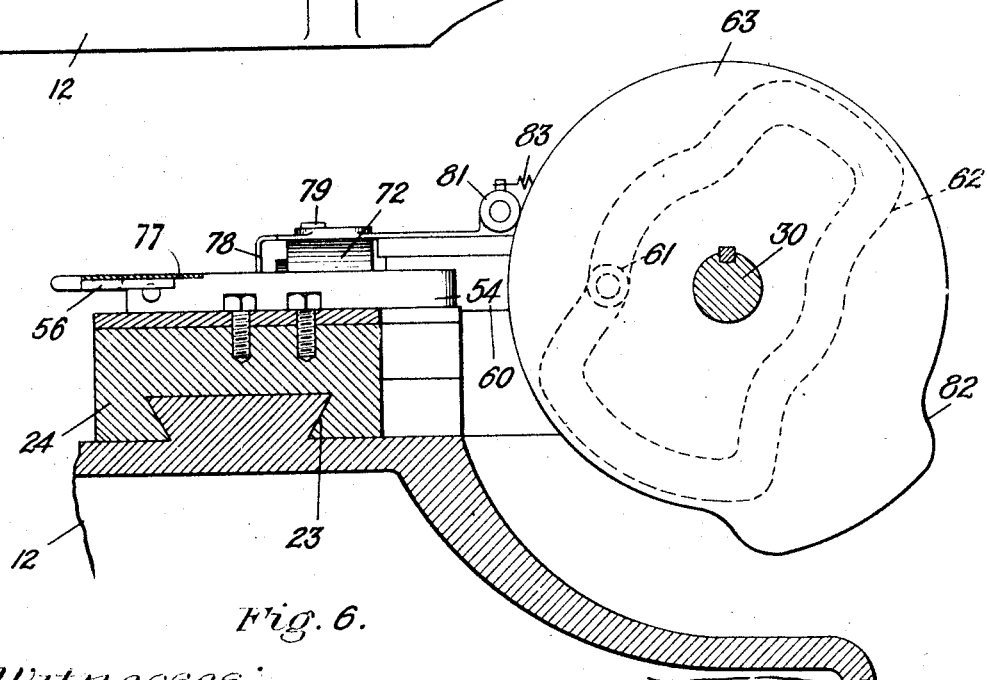

Referring to the drawing in which similar numerals of designation refer to similar parts throughout the several views, Figure 1 is a top plan view of a machine embodying my invention, the jaws of one of the tongs being shown holding a ring against the electrodes while the same is being welded, and the jaws of the other pair of tongs being shown holding a ring which has already been welded, and from which the bur is being removed by one of the presses. Fig. 2 is a front elevation of the same. Fig. 3 is an elevation of the right hand end of my machine, a portion of the large gear being shown broken away in order better to illustrate the parts. Fig. 4 is a top plan view on an enlarged scale of the welding mechanism shown in Fig. 1, the tongs being shown in the position which they occupy on the backward movement of the same. Fig. 5 is a front elevation of the enlarged view shown in Fig. 4. Fig. 6 is a cross sectional view on line 6—6 of Fig. 4. Fig. 7 is a similar view on line 7—7 of Fig. 4. Fig. 8 is a similar view on line 8—8 of Fig. 1, but showing the controller out of contact. Fig. 9 is a detail sectional view on line 9—9 of Fig. 1. Fig. 10 is a detail sectional view on line 10—10 of Fig. 1. Fig. 11 is a transverse sectional view on line 11—11 of Fig. 4. Fig. 12 is a cross section of the feeding hopper. Fig. 13 is a cross section on line 13—13 of Fig. 2. Fig. 14 is a detail view in perspective.

The machine which I illustrate in the drawing consists of a table 12 mounted upon legs 13. Brackets 14 are formed on the table to support the secondary 15 of the transformer 16. The secondary 15 is fitted between a pair of said brackets and is provided with lugs 17 that are adapted to rest upon and be bolted to the said brackets. In the transformer are the usual laminated cores 18, the plates being held together by end frames 19 and bolts 20. There are also the usual primary coils, (not shown). Upon the upper terminals of the secondary are mounted electrodes 21, which are secured to said terminals by bolts 22. Upon the upper surface of the table a dovetailed guide-way 23 extends throughout the length of the table, parallel to its forward edge. Upon this guide-way is mounted the main slide 24, upon the left end of which is the boss 25, upon which is journaled an anti-friction roller 26, by which the slide is reciprocated upon the guide-way 23. The roller 26 is engaged by cams 27 and 28 which are removably attached to the face of a drum 29, as by screws 27ˣ and 28ˣ, the drum being fast upon a shaft 30 that is journaled in bearings 31 and 32 parallel to and at the rear side of the table. The shaft 30 carries a gear 33, which is driven by a pinion 34 on the driving shaft 35. The driving shaft has a belt pulley 36 which runs loose upon it, and which is engaged with the driving shaft by a clutch 37, the latter being operated by an arm 38 on a rock-shaft 39 that carries a handle 40 by which it can be rocked. The cam 28 moves the slide 24 to the right, and the cam 27 moves it to the left. The amount of movement can obviously be variously regulated by substituting suitable cams for the cams 27 and 28. The slide 24 is provided with two guide-ways 41 and 42 transverse to the guide-way 23 (see

Fig. 5), that is, extending front and back of the machine. In said guide-ways 41 and 42 are mounted cross slides 43 and 44, the cross slide 43 having an anti-friction roller 45, which is engaged by a path cam 46 in a disk 47, so that by the rotation of the said disk the slide 43 is moved toward and from the electrodes. The slide 44 is moved in a similar manner by the anti-friction roller 48, which is engaged by a path cam 49 in a disk 50.

Two studs 51 and 52 are secured in the upper face of the slide 43, and levers 53 and 54 are pivoted upon the said studs. At their front ends the said levers have jaws 55 and 56 respectively for engaging the rings as hereinafter described. Each jaw is secured to its lever by a countersunk screw 57 passing through a slot in said jaw. The levers 53 and 54 are connected at their rear ends by toggle-links 58, 58, the central pin 59 of which links is as shown in Fig. 4, mounted in a slide 60, the latter being mounted in a guide-way in the slide 43 (see Fig. 11). The slide 60 carries an anti-friction roller 61 by which it is reciprocated, the said roller engaging a path cam 62 in the disk 63. The disks 47 and 63 are connected together by the sleeve 64 formed on the disk 47, to which sleeve the hub 65 of the disk 63 is secured. In order that the disks and path cams may travel with the slide 43 throughout its movement, the sleeve 64 is splined on the shaft 30, and the slide 24 is provided with an arm 66 (see Figs. 4 and 7), which is recessed in its upper face to receive the sleeve 64, and which is of such width as to fit between the disk 47 and the hub 65 of the disk 63. By this construction, whenever the slide 24 is reciprocated along the guideway 23, the arm 66 will cause the two disks to have a corresponding movement, so that said disks are always in proper relation to the parts which their cams operate. It will be seen that the path cam 46 causes the jaws 55 and 56 to approach and recede from the electrodes, and that the cam in the disk 63 causes the said jaws to be moved toward each other or to be separated.

For the purpose of forcing the link to be welded against the electrodes, a central jaw 67 (see especially Fig. 7) is mounted in a slot formed in plate 68, so that it can reciprocate toward and from the electrodes. The rear end of the jaw 67 has a head 69 against which a plug 70 is forced by a spring 71, the plug and spring being mounted in a socket formed in a boss 72 on the slide 43. The forward movement of the jaw 67 is limited by the striking of its head 69 against the rear side of the plate 68.

The rings which are to be welded in the machine are preferably formed so as to have a slight space left between the arms of the ring before the same are welded together. Rings of such character are held by the vertical hopper 73, which is preferably circular and has an interior diameter slightly larger than the external diameter of the rings. On the interior of said hopper opposite to the electrodes is located a knifeedge 74, (see Fig. 12) which extends from top to bottom and serves to keep the openings of the rings always in proper position for engagement with the tongs and electrodes. Such hopper is secured by brackets 75 to the standard 76, which is secured to the brackets 14 in any suitable manner. The lower end of said hopper is raised a little bit above the level formed by the upper surface of the tongs, and is so situated that the lower ring of the rings in the hopper will be in proper position for engagement with the jaws of either of the pairs of tongs. In order to permit the lower ring of the hopper to slide over the upper surface of the tongs and connections when moved underneath, the upper surface thereof is made flush and all openings which might furnish obstruction to the ring are filled in, as for instance, at 77 where a plate is installed for such purpose and is kept in position by having two arms which respectively engage with the nearer jaw of each of the tongs, and are secured thereto in any suitable manner. The jaws 55 and 56 under the combined action of the slide 24 and the slide 43, have a four-way motion; they approach a ring and squeeze it together, and when the joint has been welded they advance the link to the press for the purpose of removing the bur until the next ring has been brought in position. Then the jaws release the first mentioned ring and are retracted, and finally they are moved to the original position ready to engage a new ring. In order to better support the ring, while one pair of jaws are letting go of one ring and engaging the next ring, I provide a metal arm 78 (see Figs. 1, 4, 6 and 7) having a blade at the outer end thereof, which blade is arranged to travel on the upper portion of the surface of the slide immediately beneath said tongs, and is connected to the boss 72 by the pin 79, which engages in the slot 80 in said arm 78. The opposite end of said arm is provided with an anti-friction roller 81, (see Figs. 6 and 1) which engages at intervals with the surface cam 82 formed on the periphery of the disk 63. 83 represents a spring which is attached by suitable means to the end of said arm 78, and is kept at a tension by being secured to a pin mounted on the main slide 43. 132 represents a stop for the purpose of limiting the inward movement of the arm 78. The said roll 81 is by this means always kept in proper position for engagement at the proper time with said surface cam. The construction and arrangement of the right hand tongs and connections being the same as that of those on the left and above described, further description of the same is unnecessary.

In order to turn the welding current on and off at the proper time, controllers are provided. The form of controller which I prefer to use is that illustrated in Fig. 8. A bracket 84 is secured upon the table, and a sleeve 85 of insulating material is secured in such bracket. The said sleeve preferably has a flange 86 at its rearward end to prevent its being forced forward in the bracket. Within the flange 86 is mounted a sleeve 87 of conductive material, a spring 88 being interposed between a shoulder formed on the exterior of the sleeve 87 and one formed on the interior of the sleeve 85 so that the sleeve 87 is yieldingly forced rearward. The rearward position of the sleeve 87 is controlled by the contact of a washer 89 which is mounted upon said sleeve to press against a shoulder formed thereon, and which also strikes upon the rear end of the sleeve 85. A wire 90 of the primary circuit of the transformer has a washer which is held against the washer 89 by a washer 91, the latter being forced home by a nut 92 secured on the sleeve 87. The sleeve 87 has its rear face armed with a disk 93, of metal of good conductivity, and also has a carbon pencil 94 mounted in a centrally formed hole therein. A sleeve 95 is fastened as by a screw 96 in the forward end of a central bore in the sleeve 87, and a sleeve 97 is slidably mounted in the sleeve 95, the forward end of the sleeve 97 having a collar 98 that bears in a bore in the sleeve 87. A spring 99 is interposed between the sleeve 95 and the collar 98, and thus yieldingly tends to force the sleeve 97 rearward. A screw 100 is mounted in the sleeve 97 and bears against the rear end of the carbon pencil, the latter being received in a central bore in the rear end of the sleeve 97. By means of the screw 100, the pencil can be adjusted to project the desired amount beyond the face of the disk 93 for a purpose to be later described.

A slide 101 is mounted in a guide-way formed in a bracket on the table, and such slide carries an anti-friction roller 102 that bears against a cam 103 on the shaft 30. A spring 104 keeps the roller in contact with the cam. In the slide 101 is formed a bore 105 in line with the sleeve 86, and a sleeve 106 of insulating material is mounted in the said bore. Within the sleeve 106 is a sleeve 107 of conductive material, the sleeve having a flange at its forward end and having washers 108 and 109 at its rearward end corresponding to the washers 89 and 91. A wire 110 of the primary circuit of the transformer has a washer that is clamped between the washers 108 and 109. A nut 111 on the sleeve 107 serves to clamp the washers 108 and 109 together, and to draw a collar on the forward end of the sleeve 107 firmly against the sleeve 106. The face of the sleeve 107 is preferably provided with a disk 112, of metal. A carbon pencil 113 is mounted in a central bore in the sleeve 107, and a screw 114 is provided for adjustment of the said pencil.

In the operation of the circuit breaker, the pencil 94 is so adjusted as to project beyond the disk 93, so that when the cam forces the slide forward, the pencils will be the parts to first come in contact. Thus any burning which comes from the making of the circuit will occur upon the pencils. After the carbons have come in contact, the metal disks will be brought in contact and afford ample cross section to conduct the current without heating. The spring 99 will permit the pencil 94 to yield, and yet will keep it firmly against the opposing pencil. Likewise the spring 88 will permit the disk 93 to yield, and yet will keep it firmly in contact with the opposing disk. When the circuit is to be broken, the slide will retract, first separating the metal disks; but as the pencils will still be in contact, no breaking of the circuit will occur, and the said disks will not be injured. After the said disks have been separated, the carbons will separate, and the burning due to the breaking of the circuit will take place only on the carbons.

The standard 76 is a U shaped casting, having the posts 115 which are connected by the arch 116. At the rear of each of the posts 115 is a guide-way formed between the projections or side walls 117 and 118, which are integral with said casting. (See Fig. 13.) In said ways are mounted slides 120 and 121 secured by the vertical strips 117[a] and 118[a] attached to the casting by bolts or other suitable means; the slide 121 being arranged to support the lower part of the die 122 and the slide 120 to support the upper part of said die. For this reason the slide 121 has the projection 123 for the purpose of providing a proper support for the lower portion of said die, and securing a proper engagement with the upper part thereof. 124 and 125 are eccentrics mounted in transverse slots 126 and 127 in said slides and suitably keyed to a shaft 128.

The latter part of the above description applies more particularly to the left hand press shown in Fig. 9, but may be applied to the right hand press, which is similar in construction.

The shaft 128 is provided with suitable bearings in the standard 76. (See Figs. 2 and 9.) 129 and 130 represent collars on said shaft 128 for the purpose of keeping the same in proper relation. 131 represents a pulley secured at the end of said shaft and connected with some suitable source of power.

The operation of my machine is as follows:—The vertical hopper 73 is filled with the unwelded rings, the openings in the same engaging with the knife edge 74, so as to be in proper position for presentation to the electrodes. The parts will be assumed to be in the position shown in Fig. 4, in which the jaws of the right hand set of tongs are shown to be retracted and separated, and the jaws of the left hand pair of tongs holding a ring which has just been welded. The machine being set in motion, the slide 24 will be moved toward the left until the left hand set of tongs is opposite the left hand press, in which position the right hand set of tongs will be opposite the electrodes, the opening between the jaws thereof being directly underneath the opening of the hopper. The toggle of the right hand set of tongs at this time is pressed forward causing the jaws of said tongs to engage with the lowermost ring of the hopper. The two slides 43 and 44 are then caused to move forward. As the slide 44 moves toward the electrodes, the central jaw 67 will be yieldingly forced against the ring, pressing the latter through grooves in the holding tongs firmly against the faces of the electrodes. At the same time the welded ring carried by the tongs on slide 43 will be moved forward to the left hand press, where the bur thereon will be removed by the die 122, actuated by the slides 120 and 121, which are timed to act at the proper moment. One ring now having been welded, and the bur of the other having been removed, both slides are retracted to the same horizontal distance from the front of the machine shown in Fig. 4. The situation of the various parts of the left and right hand sets of tongs will then be in the same relation respectively as that of the right and left hand sets of tongs in Fig. 4. The slide 24 is then moved back to its original position and both sets of tongs advanced on their respective slides, and the operation above referred to repeated with relation to the electrodes and the right hand press. During the period immediately preceding the seizing of the ring by the jaws of the tongs, the ring is temporarily supported by the blade on the arm 78, which, after the ring has been securely seized, is retracted to the position shown in Fig. 7. When the ring has been welded and the bur thereof removed in the manner above described, it is dropped through one of the openings 133, and received in a chute or bin below. (Not shown.) When one of the rings is in the process of being welded as shown in Fig. 1, the circuit is completed by the controller shown in Fig. 8, and maintained until the links have been properly heated and the weld squeezed together, after which the current is broken.

It is very desirable in a machine of this character to simplify as much as possible the mechanism for welding. After a ring has been welded it is of great importance that the bur of the same be quickly removed before the temperature of the ring has become reduced, since in such case the presses act much more effectively than after the ring has become cold. It will be observed that by locating, as set forth in the above description of my invention, two pairs of tongs in front of and in close proximity to the electrodes and presses, great economy of time and power is secured. While one ring is moved forward to be welded, the ring which has just been welded is at the same time rapidly moved into position for one of the presses to remove the bur on the same. When the tongs release the finished ring and are moved back and toward the press which has been remaining unused, the mechanism required to seize and force one of the unwelded rings against the electrodes also forces forward the ring held by the other pair of tongs to its press. There is thus an alternate movement of the slide carrying the tongs, moving first one pair and then the other to the electrodes, and at the same time employing the presses without delaying the welding process. The welding goes on continuously, and the same carrying power employed to effect such welding is also utilized in carrying the welded rings to the bur removing presses. This is accomplished by the mechanism causing the fourway movement of the tongs above described. Since each pair of tongs has its own press neither pair of tongs will encroach upon the field of the other, except in front of the electrodes, which matter is of no importance, because while the ring held by one pair of tongs is being welded, the ring held by the other pair of tongs is acted upon by its bur removing press.

I am aware that the principle of double slides, that is, one slide mounted upon another, is old, but I believe myself to be the inventor broadly of means or mechanism for moving two pairs of tongs under a hopper containing the work, and by alternately moving said pairs of tongs first in one direction and then in another to accomplish with great rapidity the operations of welding the article, and removing its bur.

What I claim and desire to secure by Letters Patent is:—

1. In an electric welding machine, a pair of electrodes, two pairs of jaws, mechanism for alternately moving each of said pairs of jaws to and from said pair of electrodes, and a press for removing the bur from a welded joint of work held by one pair of jaws while the other pair of jaws is holding work in operative relation with the electrodes.

2. In an electric welding machine, a pair of electrodes, two connected slides arranged to move in front of the same, two pairs of tongs mounted on said slides, each pair being arranged to move to and from said electrodes alternately.

3. In an electric welding machine, a pair of electrodes, two presses for removing the bur from the welded joint, two pairs of tongs adapted to move to position opposite the electrodes and presses and mechanism for alternately moving each of said pairs of tongs to and from said pair of electrodes, and to and from one of said presses.

4. In an electric welding machine, two presses for removing the bur from the welded joint, a pair of electrodes located between said presses, two pairs of tongs, and means for alternately moving each of said pairs of tongs to and from said pair of electrodes and to and from said presses.

5. In an electric welding machine, two presses for removing the bur from the welded joint, a pair of electrodes located between said presses, a main slide movable across the face of said electrodes, two cross slides arranged to move transversely upon said main slide, a pair of tongs secured to each of said cross slides, and means for moving each of said cross slides to and from said pair of electrodes, and to and from one of said presses.

6. In an electric ring welding machine, a pair of electrodes, a stationary ring hopper, a pair of tongs arranged to move under said hopper to and from said electrodes, and mechanism for opening the jaws of said tongs when under said hopper, and closing upon one of the rings to be welded.

7. In an electric ring welding machine, a pair of electrodes, a stationary ring hopper vertically arranged, a main slide movable parallel to the face of said electrodes, two cross slides each having a depression in the surface thereof and arranged to move upon said main slide under said hopper, pairs of tongs secured in said depression and of such thickness as to be flush with the undepressed surface of said cross slides, and mechanism for opening the jaws of said tongs when under said hopper, and causing one of the rings to be seized and carried by said jaws.

8. In an electric ring welding machine, the combination of a pair of electrodes, a stationary hopper having a means therein to engage the openings of the rings and retain the rings in proper position, a pair of tongs arranged to move under said hopper to and from said electrodes, and mechanism for opening the jaws of said tongs when under said hopper and closing them upon one of the rings to be welded.

9. In an electric welding machine, a pair of electrodes, a plurality of pairs of tongs, means for moving the pairs of tongs separately to and from the electrodes, and a press for acting on the work held by one pair of tongs while another pair of tongs is in operative position with relation to the pair of electrodes.

10. In an electric welding machine, the combination of a pair of electrodes, a press disposed at each side of said pair of electrodes, two pairs of jaws for moving the work from the electrodes to one of the presses, and means for moving the jaws to and from the electrodes.

11. In an electric welding machine, a pair of electrodes, two pairs of work holding jaws, means for moving either of the pairs of jaws in front of said electrodes, and means for moving the jaws to and from the electrodes.

In testimony whereof I have hereunto set my hand in presence of two subscribing witnesses, this twenty second day of June 1908.

MICHAEL B. RYAN.

Witnesses:
 EVERETT N. CURTIS,
 ELMER L. BRIGGS.